United States Patent
Tseng et al.

(10) Patent No.: US 11,346,679 B2
(45) Date of Patent: May 31, 2022

(54) METHOD AND APPARATUS FOR ROUTE CHARACTERISTIC DETERMINATION AND PRESENTATION

(71) Applicant: FORD GLOBAL TECHNOLOGIES, LLC, Dearborn, MI (US)

(72) Inventors: Fling Tseng, Ann Arbor, MI (US); Pankaj Kumar, Dearborn, MI (US); Hassene Jammoussi, Canton, MI (US); Fakhreddine Landolsi, Canton, MI (US); Imad Hassan Makki, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 630 days.

(21) Appl. No.: 15/832,340

(22) Filed: Dec. 5, 2017

(65) Prior Publication Data

US 2019/0170529 A1 Jun. 6, 2019

(51) Int. Cl.
*G01C 21/34* (2006.01)

(52) U.S. Cl.
CPC ..... *G01C 21/3484* (2013.01); *G01C 21/3415* (2013.01); *G01C 21/3469* (2013.01); *G01C 21/3461* (2013.01)

(58) Field of Classification Search
CPC ......... B60W 2550/00; B60W 2550/12; B60W 2550/14; B60W 2550/20; B60W 2550/22; B60W 2550/40; B60W 2550/402; B60W 2550/406; G01C 21/00; G01C 21/12; G01C 21/20; G01C 21/26; G01C 21/265; G01C 21/34; G01C 21/3484; G01C 21/3415; G01C 21/3469; G01C 21/3461; G01C 21/36; G01C 21/3611; G01C 21/3632; G01C 21/3664; G01C 21/367; G01C 21/3673; G01C 21/3679; G01C 21/3697; G06F 3/00; G06F 3/04; G06F 3/0484; G06Q 10/00; G06Q 10/04
USPC ........................................................ 701/425
See application file for complete search history.

(56) References Cited

U.S. PATENT DOCUMENTS

| 6,088,649 | A  | * | 7/2000 | Kadaba ............. | G01C 21/3611 |
| | | | | | 701/538 |
| 6,216,086 | B1 | * | 4/2001 | Seymour ............ | G01C 21/3446 |
| | | | | | 701/425 |
| 8,374,781 | B2 | * | 2/2013 | Hartman ............ | G01C 21/3484 |
| | | | | | 701/123 |
| 8,972,090 | B2 | * | 3/2015 | Weslati .................. | G06F 17/00 |
| | | | | | 701/22 |
| 9,261,374 | B2 | * | 2/2016 | Mundinger ........... | G06Q 40/08 |
| 9,401,088 | B2 | | 7/2016 | Gueziec | |
| 9,754,428 | B2 | * | 9/2017 | Mitchell ............... | B60W 40/09 |
| 10,024,675 | B2 | * | 7/2018 | Schlesinger ....... | G01C 21/3438 |

(Continued)

*Primary Examiner* — Anthony R Jimenez
(74) *Attorney, Agent, or Firm* — Michael Spenner; Brooks Kushman P.C.

(57) ABSTRACT

A system includes a processor configured to receive a set of user attribute preferences for a trip. The processor is also configured to determine a plurality of trip routes, the routes having variance in a value for at least one user attribute preference as compared to other of the routes. The processor is further configured to present the plurality of routes in a selectable manner, including displaying an attribute value associated with each route and implement navigation for a selected route.

16 Claims, 5 Drawing Sheets

(56) References Cited

U.S. PATENT DOCUMENTS

2014/0149573 A1* 5/2014 Tofighbakhsh ....... H04W 4/027
709/224
2016/0202074 A1 7/2016 Woodard et al.
2016/0298977 A1* 10/2016 Newlin .................. G01C 21/20

* cited by examiner

METHOD AND APPARATUS FOR ROUTE CHARACTERISTIC DETERMINATION AND PRESENTATION

TECHNICAL FIELD

The illustrative embodiments generally relate to methods and apparatuses for route characteristic determination and presentation.

BACKGROUND

As vehicular mobility transitions from human to computer as a driver, people will spend less time operating the vehicle and may give additional attention to other aspects of mobility. Navigation, routing and the effective yet personalized way of communicating with the user may be of importance as part of an overall experience, as the world adopts usage of personalized autonomous vehicles (AVs). During a destination selection and subsequent route selection procedure, typical definitions of trip attributes such as travel time and distance may require supplementation with additional or other attributes.

Systems have been proposed that automatically summarize frequent locations and related recurrent routes. Basic trip information such as trip time, trip distance and stop duration may be initialized (with a first observation) and then incrementally updated with subsequent repetitions. Alternatively, user managed location and route information may also serve the same purpose if those data sets are available.

SUMMARY

In a first illustrative embodiment, a system includes a processor configured to receive a set of user attribute preferences for a trip. The processor is also configured to determine a plurality of trip routes, the routes having variance in a value for at least one user attribute preference as compared to other of the routes. The processor is further configured to present the plurality of routes in a selectable manner, including displaying an attribute value associated with each route and implement navigation for a selected route.

In a second illustrative embodiment, a system includes a processor configured to receive a set of route-attributes. The processor is also configured to order the set of attributes based on route characteristics corresponding to attributes of traveled routes. The processor is further configured to determine a plurality of routes to an input destination. Also, the processor is configured to present an ordered, predefined number of the plurality of routes in a list-selectable manner, ordered and selected based on the ordered set of attributes and use a selected one of the routes for navigation.

In a third illustrative embodiment, a computer-implemented method includes determining a route context associated with a received destination, based on a characteristic of the destination. The method also includes retrieving user-defined attributes defining preferences for user route selection saved in association with the context. The method further includes presenting a selectable, predefined list of routes, chosen from a plurality of routes based on the presented routes having attribute values demonstrating the closest correlation to the preferences and using a selected route for navigation to the destination.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
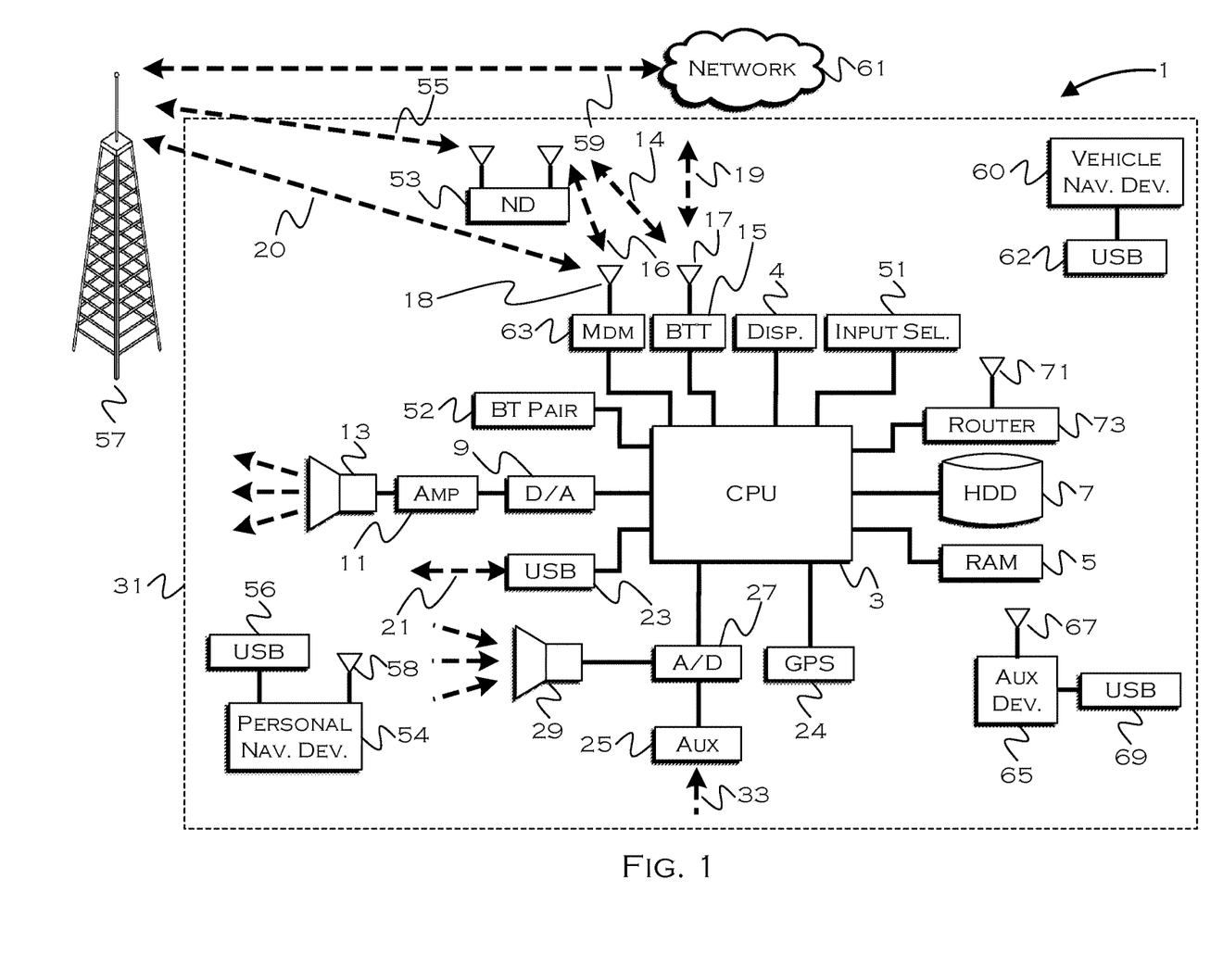
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments contemplate a highly configurable trip scout that may be always analyzing trip data, presenting information that is most relevant to the user and enabling the user to define, share and use other user defined trip attributes to analyze their own (frequent) trips. As a result, the user will be able to know more (post trip and prior to trip previews) about the routes with different customizable perspectives and make choices that best suit the user's needs and preferences.

An initial basic set of attributes that may be considered by a navigation "scout" process (referred to as such because it "scouts" the various routes based on user defined parameters) may include attributes such as time and distance (traditional attributes for navigation routes), as well as a predicted amount of fuel required, an expected average fuel economy and identified severity and duration of traffic stoppages. Many existing navigation systems can provide the above attributes with reference to present values at remote locations (e.g., traffic exists, now, twenty miles down the road). Often, however, this information does not reflect the expected state of affairs when the user arrives (.e.g., traffic exits now, twenty miles down the road, but traffic is expected/predicted to clear by the time the user arrives, rendering the present traffic largely irrelevant to the user).

The information may also not address the variability of each of the attributes which can be estimated through variance. Some these attributes may be correlated for example if the variability in speed is high and the potential of stoppages is also high, for a combustion engine based vehicle the fuel economy impact may produce a decreasing trend with increased variability; for a hybrid electric vehicle the impact on fuel economy be trending higher and with much higher variability due to engagement of the regen braking In addition, users may specify or select from an expanded list of attributes. Typically, these attributes will correspond to some data identifiable through a navigation system, but the attributes do not always expressly related to navigation. For example, a user could specify a route passing parks or lakes or scenic views, and as long as the navigation system could somehow identify those characteristics of terrain, the attributes could be accommodated. Less tangible characteristics, such as a "smooth ride" could also be requested and modeled, based on, for example, measured values by other vehicles or road characteristics corresponding to other smooth rides.

The scout process may also have access to selectable advanced navigation-related features. This could include, for example:

Number of left turns—since a left turn will often involve the vehicle stopping for variable durations, this may negatively impacts a total trip time and fuel economy (except for hybrids and electrified vehicles, which benefit from regenerative braking).

Time in low speed/Time in idle/Time in motion—how smoothly a vehicle moves for a trip can be quantified if the trip has an average distribution in terms of time in speed. The partitioning (slow/stopped/fast) may be finer to involve different speeds, but at a minimum this captures whether a vehicle is idled (in traffic or subject to traffic controls), slowly moving, or moving freely. This can provide granularity to trip time, as well as show a user a route with a high frequency of fast moving travel, even if that route is not the shortest route.

Road Class—information may be provided about whether suburb, regular local road or highway driving is part of the route being proposed. When a user changes the setting in navigation to adopt a certain preference, that user may find themselves driving in community neighborhoods, which may be something the user seeks to avoid to decrease the risk to children and pets.

Increment weather ahead—a look ahead type of may be a helpful and appropriate integration to display or inform a user of weather, especially along longer routes. Along a longer route, only a certain portion of the route may be impacted by inclement weather or other disturbances that may introduce inconveniences for the trip (e.g. road work). If detailed info. throughout the route creates too much content, simple rules that display only "less than ideal" or certain specified conditions can be implemented.

Enroute Personal POI's—consolidation of trips is one of the best ways to save the total cost associated with personal mobility. Such planning can be facilitated with the integration of the user's calendar and/or through the use of learned location models. Predictive models can provide a list of potential locations the user may visit given the context (day, time and current location) in the near future. In addition, a list of overall most frequently visited locations may also serve the same purpose. Providing such info during trip planning give the user an opportunity to create a multi-stop trip that includes locations the user would desire, but may have forgotten.

Enroute Cheap Gas Stations/Gas Service and Deal Finder (or other merchant related inquiries)—a personal mobility scout may also evaluate the operational needs of the vehicle to make sure of its wellbeing and ensure energy required for subsequent trips is replenished accordingly. The integration of refueling services could include this data as a part of trip planning if fuel is expected to fall below a defined minimum. This could also take into account a user's preference of branded fuels. If the fuel level is not dangerously low, a user's preference may out-influence a need for fuel. On the other hand, if a fuel level is dangerously low, refueling in the near future may supersede user brand preferences. Depending on how long a stop at current or next location may be, on-demand refueling service (fuel brought to the driver) may be of interest, particularly if the service provider is promoting in the area or the stop duration is long enough where some of these service providers will provide discount for a non-urgent refueling.

Usage in the last X number of days—this value represents how many times a particular route was chosen in the past X number of days. This data shows a user how many times they used a certain route versus other alternatives.

Figure 2:
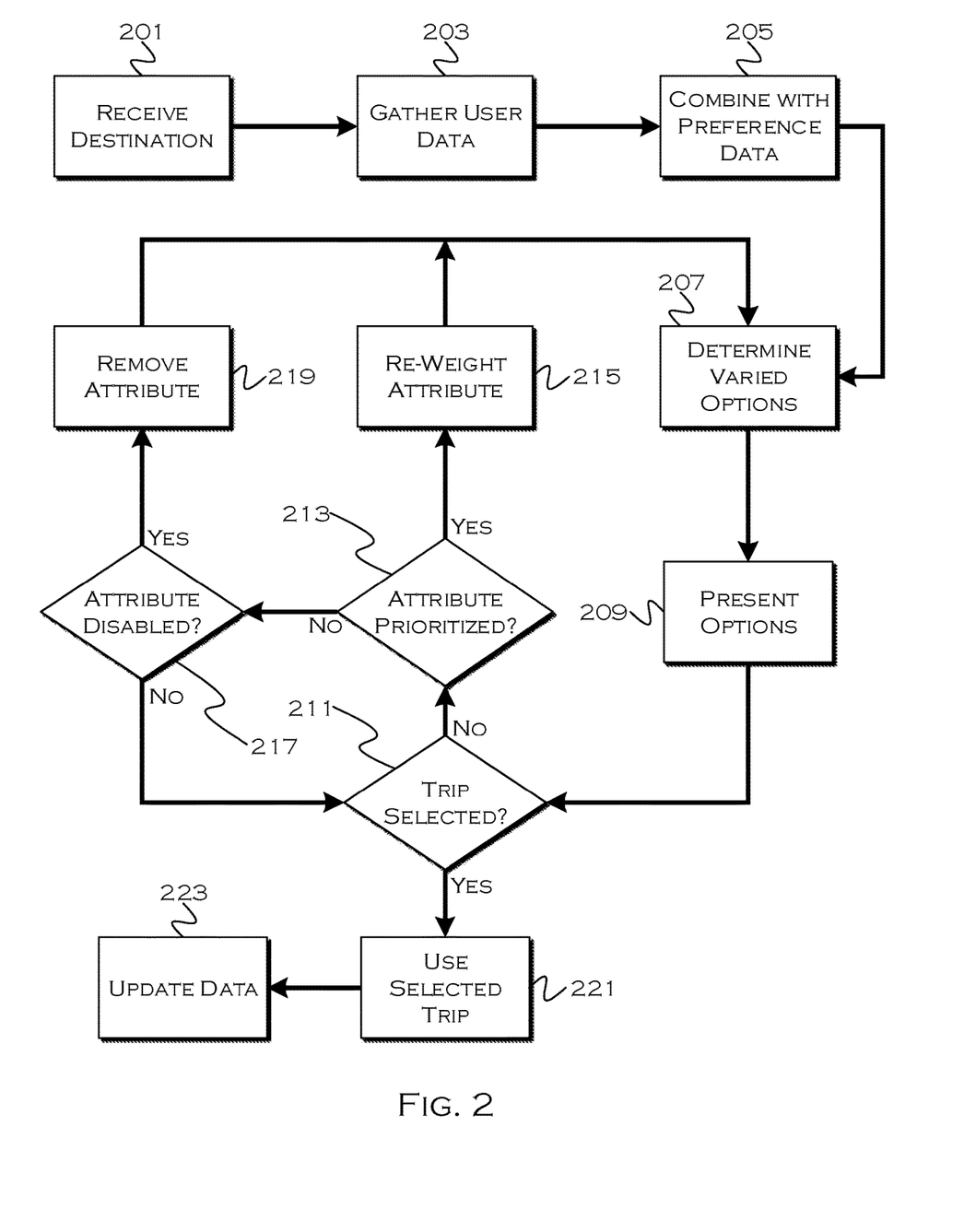
FIG. 2 shows an illustrative example of a trip review and presentation process.

FIG. 2 shows an illustrative example of a trip review and presentation process. In this illustrative example, the process receives 201 a user destination and gathers 203 any current user input as to variables impacting the instant trip. For example, if the user is inputting a destination, the user may also select "trip speed" at the time of input, even if a fast trip is not typically of importance to a user. This data is combined 205 with any predefined user preference data, and the process determines 207 a set of varied route options, differing from each other by at least one attribute value. The specific attributes considered may vary from user to user, so one user may be concerned about time of travel and fuel, and another user may only be concerned about low-stoppage routes and route-proximate scenery (parks and lakes, for example).

The process then presents 209 the selectable route options, and if the user selects one of the options 211, the process can use the selected trip 221 as the preferred trips. Depending on which attributes dominate the selected route (e.g., if it is the "best" choice in terms of certain attributes), the process can also update 223 user data to reflect the chosen options. This update can be used for predicting what routes a user would prefer, and may result in more routes focused on the preferred attributes the next time a route is presented. The predictive nature can rely on context (day, date, time, weather, etc) or simply can generally use the data predictively (e.g., each time any route is presented).

If a route is not selected, the user may have prioritized 213 a certain attribute (e.g., time of travel) or disabled 217 a certain attribute (e.g., fuel economy). Users may prioritize an attribute to see a new set of route options that focus heavily on the prioritized attribute(s). In a similar manner, users may disable an attribute so the process reconsiders routes without giving consideration to the disabled attribute. Prioritization of one or more attributes causes a re-weighting 215 of those attributes, and disabling an attribute causes that attribute to me removed 219 from consideration. The process then derives new possible routes and presents those routes for selection.

Figure 3:
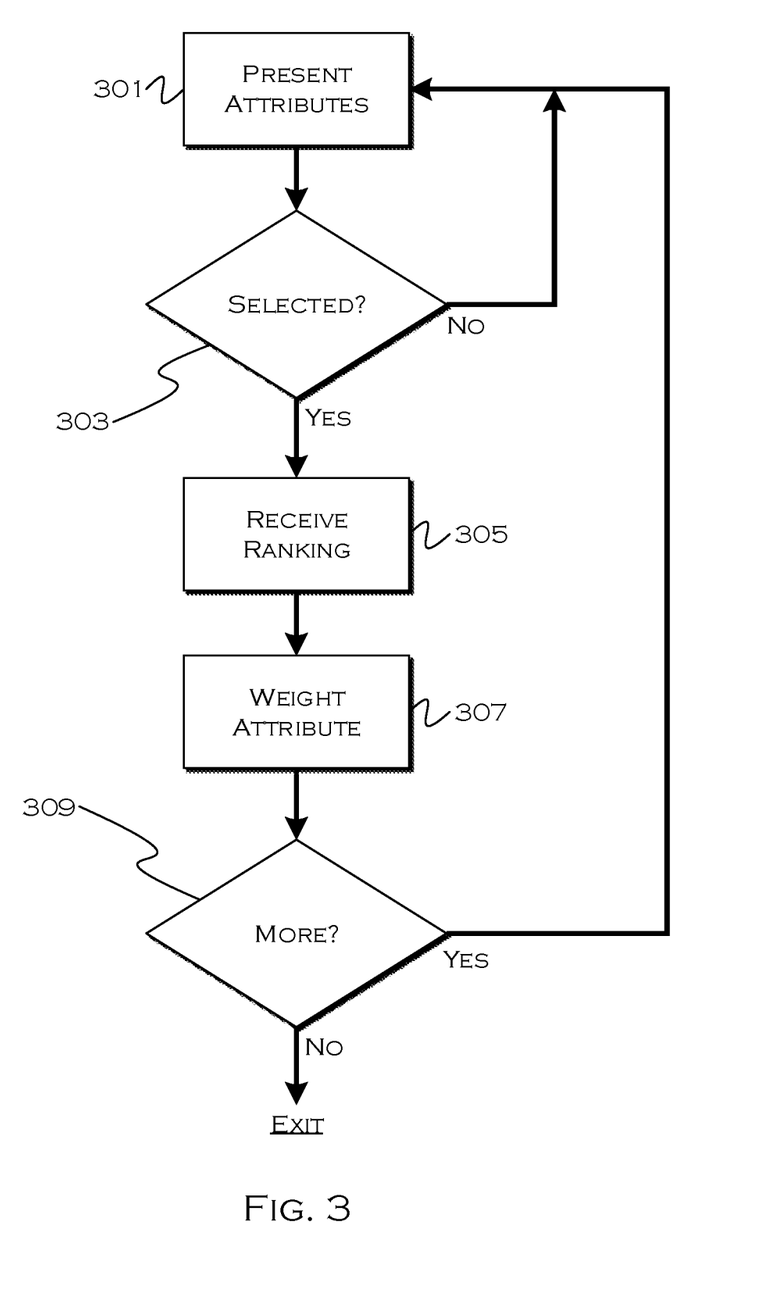
FIG. 3 shows an illustrative example of an attribute sorting process.

FIG. 3 shows an illustrative example of an attribute sorting process. This process can occur when a user is presented with a series of route options, and the user selects, deselects or reorders weighting of preferences. The individual preferences (attributes) may be presented as selectable options, and selection of an option can offer a user a choice to move the option up or down on a list of preferences.

The process 301 presents the attributes as part of a displayed set of routes, or, in another example, as a separate ordered list based on current ranking. The user can select 303 an attribute for re-ranking, and the user can enter 305 a new rank or weight for the attribute. The process can then apply 307 the new weighting, and this process can repeat until all attributes have been re-weighted.

Weighting of attributes may be relevant because there may technically be thousands of route options between a current location and a destination. By choosing a finite set based on weighted attributes, the user is shown a discrete number of options that most likely correspond to user preferences. Re-weighting options may result in a partially or completely different set of routes.

In another example, the process may receive a user set of attributes and/or begin with an OEM defined set of attributes. The process can then examine the routes traveled by the user and determine which attributes appear to be more important to a user. This can provide a basic set of ordered ranking of attributes for initial route selection. This observation may also result in inclusion of one or more new attributes in an attribute list, to account for frequent commonalities over routes, the communities which may not be addressed by any of the presently selected attributes.

Figure 4:
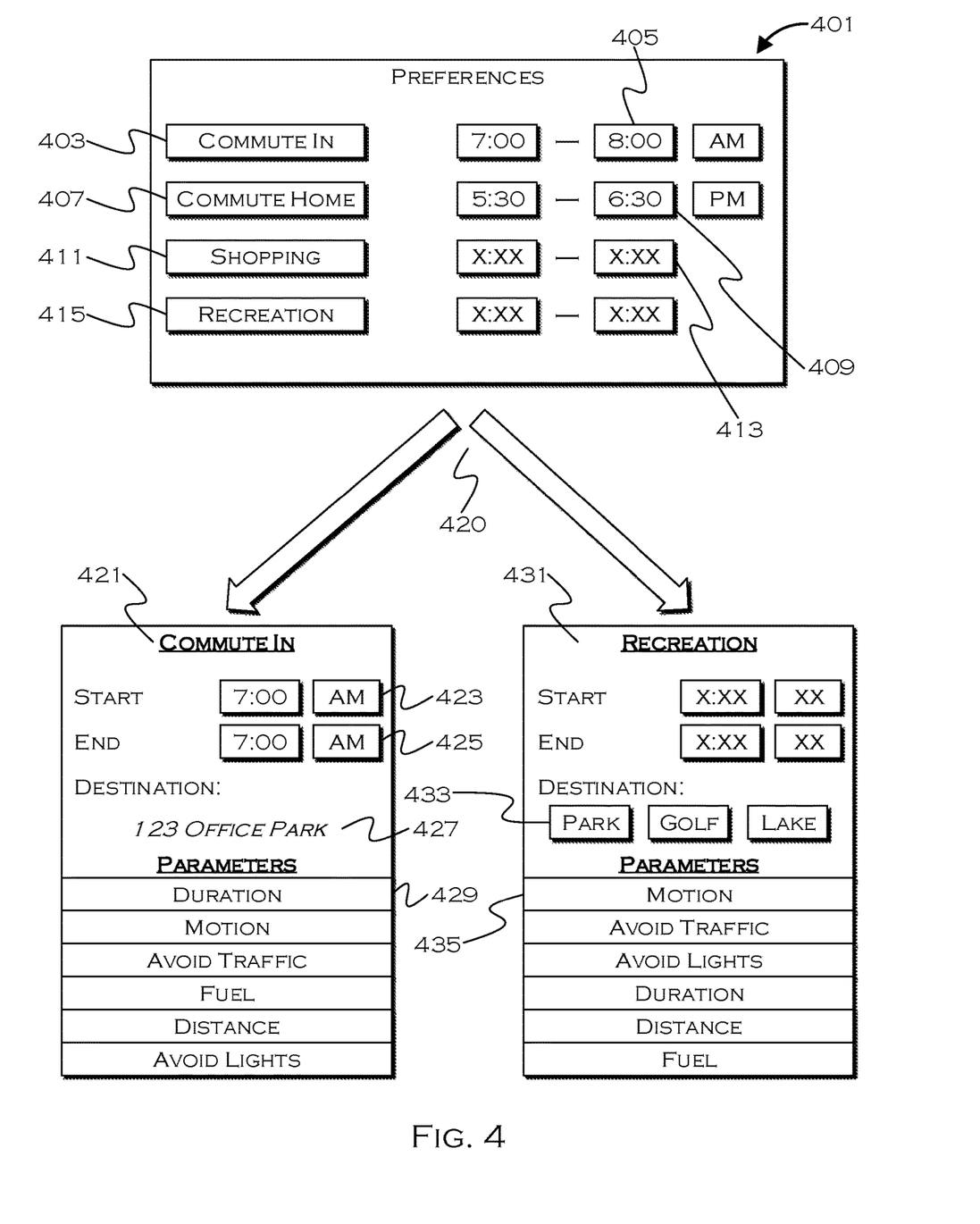
FIG. 4 shows an illustrative series of display windows.

FIG. 4 shows an illustrative series of display windows. This is a purely illustrative concept and is not intended to limit the scope of the invention in any way, but rather to demonstrate a possible display of trip attributes in a configurable manner. In this example, the display shows a first set of trip settings 401, which includes a variety of commonly observed trip types. These include, but are not limited to, commutes to work 403, commutes home from work 407, shopping trips 411 and recreational trips 415.

The process includes start 405 and end 409 times for the observed trips, if a sufficient number of similar trips have been observed in order to characterize those trips as commonly occurring at certain times. For trips which occur more randomly (e.g., shopping, recreation), the process may not set any times 413. Selection of a particular trip type may cause the display to branch 420 to a sub menu for configurable attributes with respect to that trip.

In this example, selection of "commute in" would branch to screen 421, which provides projected start 423 and end 425 times. Here, the user can manually adjust the preferences in order to better capture the timing, which may be especially useful if the user changes jobs in order to accurately reflect the new commutes for a new job.

Since this is a common trip based on observation, the destination 427 attribute may also be known. Thus, if a user inputs a destination corresponding to the destination attribute, the process may treat that trip as a commute type trip, even if the trip falls outside the common hours for the trip. Since a "commute home" trip would have the home location as a destination, the process may choose not to always choose "commute home" as a trip type when "home" is a destination, since virtually every trip of any type will eventually end at home.

The attribute window also shows a current ordering 429 (and weighting, if desired) of attributes, which define a basis for route selection based on an ordering of user preferences. This ordering may also define what data sets are shown to a user (e.g., displaying representations of the top 3 attributes) when an ordered list of possible routes is shown. Here, the user can slide attributes up or down, or could even, in some examples, adjust direct weighting and/or select certain attributes for display, even if they are not in the top N.

The recreation window 431 is similar to the commute in window, except that there are not common start or end times defined for recreational trips. Instead, the destination has classes 433 of destinations which define when a trip is recreational. Thus, in this example, if a destination corresponds to a park, a golf course or a lake, the trip is considered recreational, and the parameters for recreation 435 are used when determining which routes to display and which attributes to display with each route. Other attributes could be added to the list based on available route/map data, and attributes could be removed or disabled from a given list as well.

Figure 5:
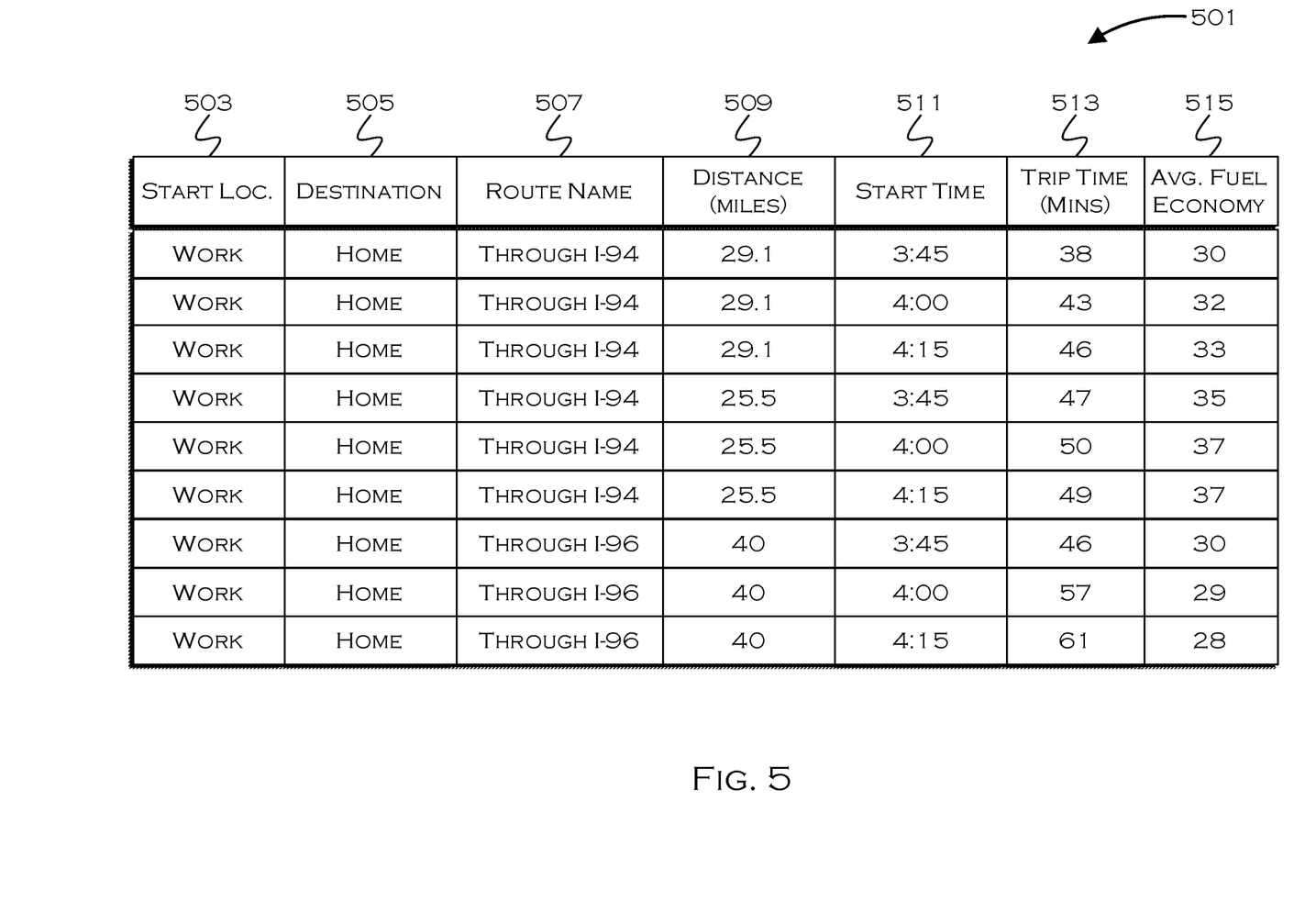
FIG. 5 shows an illustrative route presentation display.

FIG. 5 shows an illustrative route presentation display 501. In this example, the process is displaying a number of "commute home" trips, all having a common origin 503 and destination 505. Simple names 507 for each route are shown, which can be user defined names or, as in this example, represent the main road on which the bulk of the travel occurs.

In this example, the parameters/attributes shown include the distance 509 of each trip, a proposed start time 511, a projected trip time 413 and an average fuel economy 515. Even though these are the only parameters shown in this example, the user may have, for example, selected "scenic" as a highest priority weighting, and therefore the user knows that these nine trips all have a scenic component. The trips may even be ordered by order of most to least scenic, even though no parameter or value is shown for a scenic attribute.

By allowing the user to define trip characteristics, and then by displaying possible trips exhibiting those characteristics, as well as displaying certain characteristics that let a user better make a decision, a user can achieve an informed selection of a route that is most likely to be pleasant or meet the user's needs.

User data and selection options could also be shared between users. Highly efficient users can share attribute rankings with others interested in speed of travel or multi-stop trips, and relaxed users can share attribute rankings with others interested in "interesting" trips that may be more languid in terms of arrival. Also, in this example, selection of any individual attribute may cause the trips to be re-ordered corresponding to the selected attribute. In one example, the displayed attributes are those that have the most variance over the various trips, in another example the displayed attributes correspond to whatever the user has designated for display.

If a user prefers a visual set of data that is less numerically informative, the user could view each route as, for example, a horizontal bar with color variations corresponding to unfavorable characteristics. The whole bar would represent the whole trip, and portions of the bar shaded varied shades of green, yellow or red (for example) would indicate areas where the user may experience aspects of travel that least correspond to user preferences. Thus, if there were significant, but short, stops along a route (a series of stop signs, for example), and a user preferred "motion" above all else, the user may view the bar with frequent and short red areas scattered throughout, and may decide to skip what is otherwise a largely green bar (meaning close correlation to preferences) because of all the stops. The user instead may choose a bar with less green, but only one long red area, so the user knows that motion is likely possible over nearly all the trip, and only one impactful delay might be expected.

The preceding might be a display case where a user has selected "motion" as a displayed characteristic on the bar, and such data may also be more usefully displayed on a bar graph, where the actual stoppage locations can be visualized, as opposed to in a chart, where a numeric (e.g., "11 stops") value may not convey the full impact of the data.

For a given set of routes, sorting can be done in a variety of manners, such as considered the individual attribute values for each route for a given attribute. For example, if the attribute was "scenic," an attribute value could be the total amount of distance the route is adjacent to "scenic" terrain. If the attribute was fuel economy, the expected fuel economy over the whole route could be the attribute value. As long as the system uses an orderable set of values for a given attribute, it does not really matter if the value is discrete (e.g., a specific number) or less defined (e.g., high, medium, low), since any sorting on attributes is typically done within the scope of the given attribute as applied to each route. Thus, even a binary (yes/no, or has/does not have) attribute value provides some level of sorting. A second tier of sorting based on a second-highest weighted attribute (and subsequent sorting) can also be applied if the initial sort does not produce a fully ordered list (i.e., the binary case, where half of the routes are "has" and half of the routes are "does not have").

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive a set of user-defined user attribute preferences for a trip, the user-defined user attribute preferences defining which attributes a navigation system is to analyze along a plurality of potential routes to a requested destination;
determine a plurality of trip routes to the destination, the routes having variance in a numeric value for two or more user attribute preferences of the user-defined user attribute preferences as compared to other of the routes;
present the plurality of trip routes in a selectable manner, including displaying at least one attribute value for a given one of the presented plurality of trip routes, the displayed at least one attribute value corresponding to at least one of the two or more attribute preferences having the variance in the numeric value for the given route, wherein the at least one attribute value to be displayed is determined based on there being a greater percentage variance between numeric attribute values of a first of the two or more attribute preferences, from route to route, as compared to numeric values of others of the two or more attribute preferences; and
implement navigation for a selected route.

2. The system of claim 1, wherein the attribute preferences are weighted relative to each other and wherein the determining a plurality of routes includes determining a predefined number of routes from all potential routes to the destination, having the highest correlation in attribute values to the weighted attribute preferences.

3. The system of claim 1, wherein the processor is further configured to order the presentation of the plurality of routes based on a most-preferred attribute and to display an attribute value associated with the most-preferred attribute, when that attribute value is not already displayed.

4. The system of claim 1, wherein the processor is further configured to additionally display a predefined number of attribute values associated with each route based on user preferences defining which attribute values are to be displayed.

5. The system of claim 1, wherein the processor is further configured to present the plurality of routes as an ordered list of routes, including attribute values, for the attribute preferences, associated with each route.

6. The system of claim 1, wherein the processor is further configured to display a plurality of attributes associated with each route and wherein the processor is configured to receive selection of an attribute and to re-order the list according to the selected attribute so that the route most closely corresponding to a preference associated with the attribute is presented at the top of the list.

7. The system of claim 1, wherein the processor is further configured to present the plurality of routes as bar graphics, each route including varied color indicators indicating where attributes, from the set of attributes, have values corresponding to predefined unfavorable versions of that attribute.

8. The system of claim 1, wherein the processor is further configured to predict a type of route based on context, and receive the set of attributes corresponding to the type of route from a predefined set associated with that type of route, saved in memory.

9. The system of claim 8, wherein the context includes a start location.

10. The system of claim 8, wherein the context includes destination.

11. The system of claim 8, wherein the context includes destination type.

12. The system of claim 8, wherein the context includes time of day and/or day of week.

13. A system comprising:
a processor configured to:
receive a set of route attributes;
order the set of route attributes based on route characteristics corresponding to attributes of traveled routes previously traveled by a user requesting a current navigation route, the order placing more frequently occurring route attributes, based on occurrence of a given attribute on the traveled routes, higher than less frequently occurring route attributes;
determine a plurality of routes to an input destination;
present an ordered, predefined number of the plurality of routes in a list-selectable manner, ordered and selected based on the ordered set of attributes, presented as a set of bar graphics, wherein each bar of the bar graphics includes a plurality of varied color indicators indicating where attributes, from the set of attributes, have values corresponding to predefined versions of that attribute, wherein the values corresponding to predefined versions of that attribute include at least a definition of values corresponding to versions of the attribute a user has identified as disfavored versions of the attribute; and
use a selected one of the routes for navigation.

14. The system of claim 13, wherein the set of route attributes is user defined.

15. The system of claim 13, wherein the set of route attributes is manufacturer defined.

16. The system of claim 13, wherein at least a portion of the set of route attributes is received wirelessly from a user system remote from the processor.

* * * * *